(12) United States Patent
Fukushima et al.

(10) Patent No.: US 11,592,703 B2
(45) Date of Patent: Feb. 28, 2023

(54) OPTICAL FILM COMPRISING A STRETCHED RESIN FILM AND A LIQUID CRYSTAL LAYER INCLUDING A POLYFUNCTIONAL COMPOUND HAVING TWO OR MORE POLYMERIZABLE GROUPS IN ONE MOLECULE, CIRCULARLY POLARIZING PLATE, AND IMAGE DISPLAY APPARATUS

(71) Applicant: FUJIFILM Corporation, Tokyo (JP)

(72) Inventors: Yuta Fukushima, Kanagawa (JP);
Keisuke Kodama, Kanagawa (JP);
Yoshinori Maeda, Kanagawa (JP);
Akira Maruyama, Kanagawa (JP);
Yuki Nakamura, Kanagawa (JP);
Shunya Katoh, Kanagawa (JP); Yuta Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/850,392

(22) Filed: Jun. 27, 2022

(65) Prior Publication Data
US 2023/0004044 A1    Jan. 5, 2023

(30) Foreign Application Priority Data

Jun. 28, 2021 (JP) .............................. JP2021-106761

(51) Int. Cl.

| | | |
|---|---|---|
| *G02F 1/1335* | (2006.01) | |
| *G02F 1/1337* | (2006.01) | |
| *G02B 5/30* | (2006.01) | |
| *C09D 125/06* | (2006.01) | |
| *C09D 123/08* | (2006.01) | |
| *C09K 19/20* | (2006.01) | |
| *C09K 19/32* | (2006.01) | |
| *C09K 19/58* | (2006.01) | |

(52) U.S. Cl.
CPC ..... *G02F 1/133541* (2021.01); *C09D 123/08* (2013.01); *C09D 125/06* (2013.01); *C09K 19/2007* (2013.01); *C09K 19/32* (2013.01); *C09K 19/588* (2013.01); *G02B 5/3016* (2013.01); *G02F 1/1337* (2013.01); *C09K 2019/2078* (2013.01); *C09K 2219/03* (2013.01); *C09K 2323/06* (2020.08)

(58) Field of Classification Search
CPC ............ G02F 1/133541; C09D 123/08; C09D 125/06; C09K 19/588; C09K 2019/2078; C09K 2219/03; C09K 2323/06
See application file for complete search history.

(56) References Cited

U.S. PATENT DOCUMENTS

| | | | |
|---|---|---|---|
| 10,192,651 B2 * | 1/2019 | Kanna ................. | C08G 18/673 |
| 10,712,484 B2 | 7/2020 | Ooishi et al. | |
| 2008/0113121 A1 * | 5/2008 | Takada ....................... | C08J 5/18 |
| | | | 428/1.31 |
| 2014/0057060 A1 * | 2/2014 | Fukagawa ......... | G02F 1/133528 |
| | | | 428/1.31 |
| 2017/0363790 A1 | 12/2017 | Ooishi et al. | |

FOREIGN PATENT DOCUMENTS

JP        2020-160465 A    10/2020

\* cited by examiner

*Primary Examiner* — Paul C Lee
(74) *Attorney, Agent, or Firm* — Edwards Neils LLC; Jean C. Edwards, Esq.

(57) ABSTRACT

Provided are an optical film, a circularly polarizing plate, and an image display apparatus in each of which the occurrence of cracks is suppressed in the obtained film in a case of being punched. The optical film includes a stretched resin film and a liquid crystal layer formed by fixing a liquid crystal compound twist-aligned along a helical axis extending along a direction in thickness, in which a $\delta a$ value calculated using a three-dimensional solubility parameter of a resin in the stretched resin film is 8.0 $MPa^{1/2}$ or less, the liquid crystal layer contains a cured substance of a polyfunctional compound having two or more polymerizable groups in one molecule, and an absolute value of a difference between the $\delta a$ value calculated using the three-dimensional solubility parameter of the polyfunctional compound and the $\delta a$ value calculated using the three-dimensional solubility parameter of the resin is 4.0 $MPa^{1/2}$ or less.

20 Claims, No Drawings

OPTICAL FILM COMPRISING A STRETCHED RESIN FILM AND A LIQUID CRYSTAL LAYER INCLUDING A POLYFUNCTIONAL COMPOUND HAVING TWO OR MORE POLYMERIZABLE GROUPS IN ONE MOLECULE, CIRCULARLY POLARIZING PLATE, AND IMAGE DISPLAY APPARATUS

CROSS-REFERENCE TO RELATED APPLICATIONS

The present application claims priority under 35 U.S.C. § 119 to Japanese Patent Application No. 2021-106761, filed on Jun. 28, 2021. The above application is hereby expressly incorporated by reference, in its entirety, into the present application.

BACKGROUND OF THE INVENTION

1. Field of the Invention

The present invention relates to an optical film, a circularly polarizing plate, and an image display apparatus.

2. DESCRIPTION OF THE RELATED ART

A liquid crystal layer having refractive index anisotropy is applied to various applications such as an antireflection film of a display device and an optical compensation film of a liquid crystal display device.

For example, JP2020-160465A discloses a method for producing a multilayer film, and discloses an optical film including a stretched resin film and an optically anisotropic layer formed by fixing a homogeneously aligned liquid crystal compound.

SUMMARY OF THE INVENTION

The optical film is molded according to the intended use. For example, the optical film is punched and adjusted to a predetermined size. It is desirable that cracks do not occur in the film obtained by such punching. In particular, it is desirable that cracks do not occur at the peripheral edge of the obtained film.

The present inventors have found that, in a case where the optical film described in JP2020-160465A is punched out, cracks occur in the obtained film.

The present invention has been made in view of the above circumstances, and an object of the present invention is to provide an optical film in which the occurrence of cracks is suppressed in the obtained film in a case of being punched.

Another object of the present invention is to provide a circularly polarizing plate and an image display apparatus.

As a result of extensive studies on the problems of the related art, the present inventors have found that the foregoing objects can be achieved by the following configurations.

Optical Film Including:

a stretched resin film; and a liquid crystal layer formed by fixing a liquid crystal compound twist-aligned along a helical axis extending along a direction in thickness, in which a $\delta a$ value calculated using a three-dimensional solubility parameter of a resin in the stretched resin film is 8.0 $\text{MPa}^{1/2}$ or less, the liquid crystal layer contains a cured substance of a polyfunctional compound having two or more polymerizable groups in one molecule, and an absolute value of a difference between a $\delta a$ value calculated using the three-dimensional solubility parameter of the polyfunctional compound and the $\delta a$ value calculated using the three-dimensional solubility parameter of the resin is 4.0 $\text{MPa}^{1/2}$ or less.

(2)

The optical film according to (1), in which the cured substance of the polyfunctional compound is more present on a surface of the liquid crystal layer on a stretched resin film side than on a surface of the liquid crystal layer opposite to the stretched resin film side.

(3)

The optical film according to (1) or (2), further including, between the stretched resin film and the liquid crystal layer, a mixed layer containing the cured substance of the polyfunctional compound and the resin constituting the stretched resin film.

(4)

The optical film according to (3), in which a thickness of the mixed layer is 5 to 50 nm.

(5)

The optical film according to any one of (1) to (4), in which the stretched resin film contains a resin selected from the group consisting of a cycloolefin polymer and polystyrene.

(6)

The optical film according to any one of (1) to (5), in which the stretched resin film contains a cycloolefin polymer, and the polyfunctional compound is non-liquid crystalline and has a hydrocarbon group having 5 or more carbon atoms.

(7)

The optical film according to (6), in which the polyfunctional compound has at least one group selected from the group consisting of a linear hydrocarbon group having 8 or more carbon atoms and a cyclic hydrocarbon group having 5 or more carbon atoms.

(8)

The optical film according to any one of (1) to (5), in which the stretched resin film contains polystyrene, and the polyfunctional compound is non-liquid crystalline and has one or more aromatic rings.

(9)

The optical film according to any one of (1) to (8), in which a weight-average molecular weight of the polyfunctional compound is 10,000 or more.

(10)

The optical film according to any one of (1) to (9), in which an in-plane retardation at a wavelength of 550 nm of the stretched resin film is 100 to 250 nm.

(11)

The optical film according to any one of (1) to (10), in which a twisted angle of the liquid crystal compound is 60° to 100°, and a product $\Delta n d$ of a refractive index anisotropy $\Delta n$ at a wavelength of 550 nm of the liquid crystal layer and a thickness d of the liquid crystal layer is 100 to 250 nm.

(12)

A circularly polarizing plate including the optical film according to any one of (1) to (13)

An image display apparatus including the optical film according to any one of (1) to (11).

According to an aspect of the present invention, it is possible to provide an optical film in which the occurrence of cracks is suppressed in the obtained film in a case of being punched.

According to another aspect of the present invention, it is possible to provide a circularly polarizing plate and an image display apparatus.

DESCRIPTION OF TILE PREFERRED
EMBODIMENTS

Hereinafter, the present invention will be described in more detail.

Any numerical range expressed using "to" in the present specification refers to a range including the numerical values before and after the "to" as a lower limit value and an upper limit value, respectively.

In addition, the slow axis and the fast axis are defined at a wavelength of 550 nm unless otherwise specified. That is, unless otherwise specified, for example, the slow axis direction means a direction of the slow axis at a wavelength of 550 nm.

In the present invention, $Re(\lambda)$ and $Rth(\lambda)$ represent an in-plane retardation and a thickness direction retardation at a wavelength $\lambda$, respectively. Unless otherwise specified, the wavelength $\lambda$ is 550 nm.

In the present invention, $Re(\lambda)$ and $Rth(\lambda)$ are values measured at a wavelength $\lambda$ in AxoScan OPMF-1 (manufactured by Opto Science, Inc.). By inputting an average refractive index $((nx+ny+nz)/3)$ and a film thickness $(d(\mu m))$ in AxoScan, slow axis direction (°)
$Re(\lambda)=R0(\lambda)$
$Rth(\lambda)=((nx+ny)/2-nz)\times d$
are calculated.

Although $R0(\lambda)$ is displayed as a numerical value calculated by AxoScan OPMF-1, it means $Re(\lambda)$.

In the present specification, the refractive indexes nx, ny, and nz are measured using an Abbe refractometer (NAR-4T, manufactured by Atago Co., Ltd.) and using a sodium lamp ($\lambda=589$ nm) as a light source. In addition, in a case of measuring the wavelength dependence, it can be measured with a multi-wavelength Abbe refractometer DR-M2 (manufactured by Atago Co., Ltd.) in combination with an interference filter.

In addition, the values in Polymer Handbook (John Wiley & Sons, Inc.) and catalogs of various optical films can be used. The values of the average refractive index of main optical films are illustrated below: cellulose acylate (1.48), cycloolefin polymer (1.52), polycarbonate (1.59), polymethylmethacrylate (1.49), and polystyrene (1.59).

In the present specification, the "visible ray" is intended to refer to light having a wavelength of 400 to 700 run. In addition, the "ultraviolet ray" is intended to refer to light having a wavelength of 10 nm or more and less than 400 nm.

In addition, in the present specification, the relationship between angles (for example, "orthogonal" or "parallel") is intended to include a range of errors acceptable in the art to which the present invention pertains. For example, it means that an angle is within an error range of ±5° with respect to the exact angle, and the error with respect to the exact angle is preferably within a range off 3°.

The bonding direction of the divalent group (for example, —COO—) described in the present specification is not particularly limited. For example, in a case where L in X—L—Y is —COO— and then in a case where the position bonded to the X side is defined as *1 and the position bonded to the Y side is defined as *2, L may be * 1—O—CO—*2 or * 1—CO—O—*2.

A feature point of the optical film according to the embodiment of the present invention is that the optical film uses a liquid crystal layer formed by fixing a twist-aligned liquid crystal compound, and contains a cured substance of a polyfunctional compound showing a δa value in which an absolute value of a difference from the δa value calculated using a three-dimensional solubility parameter of a resin contained in a stretched resin film is within a predetermined range.

The present inventors have examined the cause of the tendency for cracks to occur in the film obtained by punching the optical film disclosed in JP2020-160465A and then found that, in an optical film including a stretched resin film and a liquid crystal layer formed by fixing a homogeneously aligned liquid crystal compound, particularly in a case where a stretching direction of the stretched resin film and an alignment direction of the homogeneous alignment are arranged in parallel, cracks are likely to occur along the direction.

Therefore, in the present invention, first, it has been found that, in a case where a liquid crystal layer formed by fixing a twist-aligned liquid crystal compound is used as the liquid crystal layer, the occurrence of cracks is suppressed even in a case where the stretching direction of the stretched resin film and the alignment direction of the liquid crystal compound on one surface of the liquid crystal layer are arranged in parallel.

Furthermore, it has been found that another factor contributing to the occurrence of cracks is that the adhesiveness between the stretched resin film and the liquid crystal layer is not sufficient.

Therefore, in the present invention, it has been found that a cured substance of a polyfunctional compound showing a δa value in which the absolute value of the difference from the δa value calculated using the three-dimensional solubility parameter of the resin contained in the stretched resin film is within a predetermined range is contained in the liquid crystal layer to thereby improve the adhesiveness between the stretched resin film and the liquid crystal layer, and as a result, the occurrence of cracks is suppressed.

The optical film according to the embodiment of the present invention is an optical film including a stretched resin film and a liquid crystal layer formed by fixing a liquid crystal compound twist-aligned along a helical axis extending along a direction in thickness, in which a δa value calculated using a three-dimensional solubility parameter of a resin in the stretched resin film is 8.0 $MPa^{1/2}$ or less, the liquid crystal layer contains a cured substance of a polyfunctional compound having two or more polymerizable groups in one molecule, and an absolute value of a difference between a δa value calculated using the three-dimensional solubility parameter of the polyfunctional compound and the δa value calculated using the three-dimensional solubility parameter of the resin is 4.0 $MPa^{1/2}$ or less.

Hereinafter, each of members included in the optical film will be described in detail.

Stretched Resin Film

The optical film according to the embodiment of the present invention includes a stretched resin film.

The stretched resin film means a resin film that has been subjected to a stretching treatment, and may be a uniaxially stretched resin film or a biaxially stretched resin film.

The resin contained in the stretched resin film is not particularly limited, and examples thereof include an acrylic resin, a styrene-based resin, a cycloolefin resin, a polyester resin, a polycarbonate resin, and a cellulose derivative.

The type of resin is classified into a resin having a positive intrinsic birefringence and a resin having a negative intrinsic birefringence, depending on the difference in optical expression in a case of being stretched. The resin contained in the stretched resin film used in the present invention may be a resin having a positive intrinsic birefringence or a resin having a negative intrinsic birefringence.

Examples of the resin having a positive intrinsic birefringence include a polyolefin such as polyethylene or polypropylene; a polyester such as polyethylene terephthalate or polybutylene terephthalate; a polyarylene sulfide such as polyphenylene sulfide; a polycarbonate; a polyalkyl sulfone; a polyvinyl chloride; a cycloolefin polymer such as a norbornene polymer; and a rod-like liquid crystal polymer.

In addition, examples of the resin having a negative intrinsic birefringence include a polystyrene-based polymer including a homopolymer of styrene or a styrene derivative (for example, polystyrene or polystyrene fluoride) and a copolymer of styrene or a styrene derivative and a certain monomer, a polyacrylonitrile polymer, and a (meth)acrylic polymer such as polymethylmethacrylate.

Above all, a cycloolefin polymer or a polystyrene is preferable as the resin contained in the stretched resin film, from the viewpoint of optical properties.

The δa value calculated using the three-dimensional solubility parameter of the resin contained in the stretched resin film is $8.0 \text{ MPa}^{1/2}$ or less. Above all, the δa value is preferably $7.0 \text{ MPa}^m$ or less and more preferably $6.0 \text{ MPa}^{1/2}$ or less from the viewpoint that the occurrence of cracks in the obtained film is further suppressed in a case where the optical film is punched (hereinafter, also simply referred to as "the viewpoint that the effect of the present invention is more excellent"). The lower limit of the δa value is not particularly limited, and is often $2.0 \text{ MPa}^{1/2}$ or more and more often $3.0 \text{ MPa}^{1/2}$ or more. As described above, the unit of the Sa value is $(\text{MPa})^{1/2}$.

In the present specification, the δa value is intended to mean a non-dispersion force component of an SP value calculated by the method of Hoy et al. (See "PROPERTIES OF POLYMERS (ED.3)" by VAN KREVELEN, D. W., published from ELSEVIER (1990)).

That is, the δa value can be calculated by Expression (X) using three-dimensional solubility parameters (δd, δp, and δh) calculated by the method of Hoy et al.

$$\delta a = (\delta p^2 + \delta h^2)^{0.05} \qquad \text{Expression (X)}$$

According to the method of Hoy et al., the respective values of δd, δp, and δh can be calculated from the chemical structural formula of a compound to be obtained.

In a case of a polymer containing a plurality of repeating units, the δa value of the polymer can be obtained in such a manner that a product of multiplying a three-dimensional solubility parameter (δd, δp, δh) of each repeating unit by a volume fraction of each repeating unit is obtained to calculate a three-dimensional solubility parameter (δd, δp, δh) of the polymer, and the calculated three-dimensional solubility parameter (δd, δp, δh) of the polymer is substituted into Expression (X).

In the present specification, the three-dimensional solubility parameter of each material can be obtained by using the software HSPiP (Hansen Solubility Parameters in Practice: software for Windows [registered trademark] for efficient handling of HSP) (ver. 5.1.08) developed by Hansen et al.

The in-plane retardation at a wavelength of 550 nm of the stretched resin film is not particularly limited, and is preferably 100 to 250 nm and more preferably 150 to 200 nm from the viewpoint that the optical properties of the optical film are more excellent.

The surface of the stretched resin film (particularly, the surface on the side where a liquid crystal layer which will be described later is laminated) may be subjected to a surface treatment. Examples of the surface treatment include a corona treatment and a plasma treatment. Application of the surface treatment facilitates intimate attachment between the stretched resin film and the liquid crystal layer, which is advantageous in terms of crack resistance. The surface treatment conditions can be adjusted as appropriate.

The thickness of the stretched resin film is not particularly limited, and is preferably 200 μm or less, more preferably 20 to 150 μm, and still more preferably 40 to 100 μm from the viewpoint of thinning In the present specification, the thickness of the stretched resin film is intended to refer to an average thickness of the stretched resin film. The average thickness is obtained by measuring the thicknesses of any five or more points of the stretched resin film and arithmetically averaging the measured values.

The method for producing the stretched resin film is not particularly limited, and examples thereof include a method of stretching an unstretched resin film using a known stretching machine such as a tenter stretching machine.

Examples of the stretching method include known methods such as longitudinal uniaxial stretching, horizontal uniaxial stretching, and simultaneous biaxial stretching or sequential biaxial stretching of longitudinal uniaxial stretching and horizontal uniaxial stretching in combination.

In addition, a commercially available stretched resin film may be used as the stretched resin film.

Liquid Crystal Layer

The optical film according to the embodiment of the present invention includes a liquid crystal layer formed by fixing a liquid crystal compound twist-aligned along a helical axis extending along a direction in thickness.

The liquid crystal layer is preferably a layer formed by fixing a so-called chiral nematic phase having a helical structure. In a case of forming the liquid crystal layer, it is preferable to use at least a liquid crystal compound and a chiral agent which will be described later.

The "fixed" state is a state in which the alignment of the liquid crystal compound is maintained. Specifically, the "fixed" state is preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

The twisted angle of the liquid crystal compound (twisted angle in the alignment direction of the liquid crystal compound) is not particularly limited, and is often more than 0° and 360° or less. From the viewpoint that the optical properties of the optical film are more excellent, the twisted angle of the liquid crystal compound is preferably 60° to 100° and more preferably 70° to 90°.

The twisted angle is measured using an AxoScan (polarimeter) device manufactured by Axometrics, Inc. and using device analysis software of Axometrics, Inc.

In addition, the phrase "the liquid crystal compound is twist-aligned" is intended to mean that the liquid crystal compound from one main surface to the other main surface of the liquid crystal layer is twisted about the thickness direction of the liquid crystal layer. Along with this, the alignment direction (in-plane slow axis direction) of the liquid crystal compound differs depending on the position of the liquid crystal layer in a thickness direction.

The value of a product Δnd of a refractive index anisotropy Δn of the liquid crystal layer measured at a wavelength of 550 nm and a thickness d of the liquid crystal layer is not particularly limited, and is preferably 100 to 250 nm and more preferably 150 to 200 nm from the viewpoint that the optical properties of the optical film are more excellent.

The refractive index anisotropy Δn means the refractive index anisotropy of the liquid crystal layer.

The Δnd is measured using an AxoScan (polarimeter) device manufactured by Axometrics, Inc. and using device analysis software of Axometrics, Inc.

The type of the liquid crystal compound used for forming the liquid crystal layer is not particularly limited, and examples thereof include a rod-like liquid crystal compound and a disk-like liquid crystal compound (discotic liquid crystal compound).

For example, rod-like liquid crystal compounds described in claim 1 of JP1999-513019A (JP-H11-513019A) and paragraphs [0026] to [0098] of JP2005-289980A can be preferably used as the rod-like liquid crystal compound.

For example, disk-like liquid crystal compounds described in paragraphs [0020] to of JP2007-108732A and paragraphs [0013] to [0108] of JP2010-244038A can be preferably used as the disk-like liquid crystal compound.

The liquid crystal compound may have a polymerizable group. The type of the polymerizable group is not particularly limited, and is preferably a functional group capable of an addition polymerization reaction, more preferably a polymerizable ethylenic unsaturated group or a ring-polymerizable group, and still more preferably a (meth)acryloyl group, a vinyl group, a styryl group, or an allyl group.

The liquid crystal layer is preferably a layer formed by fixing a liquid crystal compound having a polymerizable group by polymerization. More specifically, the liquid crystal layer is more preferably a layer formed by fixing a twist-aligned liquid crystal compound having a polymerizable group by polymerization.

The liquid crystal layer contains a cured substance of a polyfunctional compound having two or more polymerizable groups in one molecule.

In a case where the polyfunctional compound has two or more polymerizable groups in one molecule and the polyfunctional compound is a compound other than a polymer having a plurality of repeating units, the number of polymerizable groups in the polyfunctional compound is preferably 2 to 12 and more preferably 2 to 9 from the viewpoint that the effect of the present invention is more excellent.

The type of the polymerizable group contained in the polyfunctional compound is not particularly limited, and examples thereof include the polymerizable groups that the liquid crystal compound described above may have. Above all, a polymerizable ethylenic unsaturated group is preferable, and a (meth)acryloyl group, a vinyl group, a styryl group, or an allyl group is more preferable.

The absolute value of the difference between the δa value calculated using the three-dimensional solubility parameter of the polyfunctional compound and the δa value calculated using the three-dimensional solubility parameter of the resin contained in the stretched resin film is 4.0 MPa$^{1/2}$ or less. From the viewpoint that the effect of the present invention is more excellent, such an absolute value is preferably 3.0 MPa$^{1/2}$ or less and more preferably 2.0 MPa$^{1/2}$ or less. The lower limit thereof is not particularly limited, and is preferably 0 MPa$^{1/2}$.

The δa value calculated using the three-dimensional solubility parameter of the polyfunctional compound is not particularly limited as long as the above-mentioned relationship is satisfied, and is preferably 0 to 10 MPa$^{1/2}$ and more preferably 4 to 8 MPa$^{1/2}$ from the viewpoint that the effect of the present invention is more excellent.

The placement position of the cured substance of the polyfunctional compound in the liquid crystal layer is not particularly limited. From the viewpoint that the effect of the present invention is more excellent, it is preferable that the cured substance of the polyfunctional compound is more present on the surface of the liquid crystal layer on the stretched resin film side than on the surface of the liquid crystal layer opposite to the stretched resin film side.

The placement position of the cured substance of the polyfunctional compound in the liquid crystal layer can be identified by time-of-flight secondary ion mass spectrometry (TOF-SIMS). More specifically, the components in the depth direction of the liquid crystal layer are analyzed by the time-of-flight secondary ion mass spectrometry while irradiating the liquid crystal layer with an ion beam, from the surface of the liquid crystal layer opposite to the stretched resin film side toward the surface of the liquid crystal layer on the stretched resin film side, a profile in the depth direction of the secondary ion intensity derived from the cured substance of the polyfunctional compound is obtained, and then the secondary ion intensity derived from the cured substance of the polyfunctional compound on the surface of the liquid crystal layer opposite to the stretched resin film side is compared with the secondary ion intensity derived from the cured substance of the polyfunctional compound on the surface of the liquid crystal layer on the stretched resin film side. In a case where the secondary ion intensity derived from the cured substance of the polyfunctional compound on the surface of the liquid crystal layer on the stretched resin film side is larger than the secondary ion intensity derived from the cured substance of the polyfunctional compound on the surface of the liquid crystal layer opposite to the stretched resin film side, it can be said that the cured substance of the polyfunctional compound is more present on the surface of the liquid crystal layer on the stretched resin film side than on the surface of the liquid crystal layer opposite to the stretched resin film side.

The polyfunctional compound is preferably non-liquid crystalline. That is, it is preferable that the polyfunctional compound is not a liquid crystal compound. Non-liquid crystalline means that the compound does not exhibit liquid crystallinity.

In a case where the stretched resin film contains a cycloolefin polymer, the polyfunctional compound preferably has a hydrocarbon group having 5 or more carbon atoms and more preferably at least one group selected from the group consisting of a linear hydrocarbon group having 8 or more carbon atoms and a cyclic hydrocarbon group having 5 or more carbon atoms, from the viewpoint that the effect of the present invention is more excellent.

The hydrocarbon group having 5 or more carbon atoms may be a monovalent group or a divalent or higher valent group. The number of carbon atoms contained in the hydrocarbon group having 5 or more carbon atoms is preferably 5 to 20 and more preferably 5 to 15. The hydrocarbon group having 5 or more carbon atoms may be linear, branched, or cyclic. The hydrocarbon group having 5 or more carbon atoms may be an aliphatic group or an aromatic groom.

The linear hydrocarbon group having 8 or more carbon atoms may be a monovalent group or a divalent or higher valent group. The number of carbon atoms contained in the linear hydrocarbon group having 8 or more carbon atoms is preferably 8 to 20 and more preferably 8 to 15.

The cyclic hydrocarbon group having 5 or more carbon atoms may be a monovalent group or a divalent or higher valent group. The number of carbon atoms contained in the cyclic hydrocarbon group having 5 or more carbon atoms is preferably 5 to 20 and more preferably 5 to 10. The cyclic hydrocarbon group having 5 or more carbon atoms may be an aliphatic cyclic hydrocarbon group or an aromatic cyclic hydrocarbon group. The cyclic hydrocarbon group having 5 or more carbon atoms may have a monocyclic ring structure or a fused ring structure.

In a case where the stretched resin film contains polystyrene, the polyfunctional compound preferably has one or more aromatic rings from the viewpoint that the effect of the present invention is more excellent.

The number of aromatic rings contained in the polyfunctional compound is preferably 1 or more and more preferably 2 to 5.

The aromatic ring may be an aromatic hydrocarbon ring or an aromatic heterocyclic ring.

The polyfunctional compound may be a polymer containing a plurality of repeating units.

In a case where the polyfunctional compound is a polymer, the weight-average molecular weight of the polyfunctional compound is not particularly limited and is preferably 10,000 or more and more preferably 15,000 or more from the viewpoint that the effect of the present invention is more excellent. The upper limit of the weight-average molecular weight of the polyfunctional compound is not particularly limited and is preferably 30,000 or less and more preferably 25,000 or less.

Here, the weight-average molecular weight and the number-average molecular weight in the present invention are values measured by a gel permeation chromatograph (GPC) method.

Solvent (eluent): N-methylpyrrolidone
Device name: TOSOH HLC-8220GPC
Column: three TOSOH TSKgel Super AWM-H (6 mm×15 cm) connected in series
Column temperature: 25° C.
Sample concentration: 0.1% by mass
Flow rate: 0.35 mL/min
Calibration curve: calibration curve for 7 samples of TSK standard polystyrene, Mw=2,800,000 to 1,050 (Mw/Mn=1.03 to 1.06), manufactured by Tosoh Corporation The polyfunctional compound is preferably a compound represented by Formula (A) or a compound represented by Formula (B).

$$R^{a1}-L^{a1}-R^{a2} \quad \text{Formula (A)}$$

In Formula (A), $R^{a1}$ and $R^{a2}$ each independently represent a polymerizable group. Examples of the polymerizable group include groups exemplified by the polymerizable group that the liquid crystal compound may have, as described above.

$L^{a1}$ represents an alkylene group having 6 or more carbon atoms or a group represented by Formula (A-1). In Formula (A-1), * represents a bonding position.

$$*-L^{a2}-L^{a3}-L^{a4}-* \quad \text{Formula (A-1)}$$

$L^{a2}$ and $L^{a4}$ each independently represent an alkylene group. $L^{a3}$ represents a divalent polycyclic aliphatic hydrocarbon group.

The number of carbon atoms in the alkylene group having 6 or more carbon atoms represented by $L^{a1}$ is preferably 8 or more from the viewpoint that the effect of the present invention is more excellent. The upper limit thereof is not particularly limited, and is preferably 20 or less and more preferably 15 or less.

The number of carbon atoms in the alkylene group represented by $L^{a2}$ and $L^{a4}$ is not particularly limited, and is preferably 1 to 5, more preferably 1 to 3, and still more preferably 1 from the viewpoint that the effect of the present invention is more excellent.

The divalent polycyclic aliphatic hydrocarbon group represented by $L^{a3}$ is a divalent group formed by removing two hydrogen atoms from a polycyclic aliphatic hydrocarbon. Examples of the polycyclic aliphatic hydrocarbon include a norbornane ring, a tricyclodecane ring, a tetracyclododecane ring, and an adamantane ring.

$$R^{b1}-L^{b2}-L^{b3}-L^{b4}-L^{b5}-R^{b2} \quad \text{Formula (B)}$$

In Formula (B), $R^{b1}$ and $R^{b2}$ each independently represent a polymerizable group. Examples of the polymerizable group include groups exemplified by the polymerizable group that the liquid crystal compound may have, as described above.

$L^{b1}$ and $L^{b5}$ each independently represent an alkylene group which may contain an oxygen atom. The number of carbon atoms in the alkylene group represented by $L^{b1}$ and $L^{b5}$ is not particularly limited, and is preferably 1 to 10 and more preferably 1 to 3. The alkylene group represented by $L^{b1}$ and $L^{b5}$ may be linear or branched.

$L^{b2}$ and $L^{b4}$ each independently represent a divalent aromatic group. The aromatic ring constituting the divalent aromatic group may be a monocyclic ring or a polycyclic ring. Examples of the divalent aromatic group include a divalent aromatic hydrocarbon ring group and a divalent aromatic heterocyclic group. Examples of the aromatic hydrocarbon ring constituting the divalent aromatic hydrocarbon ring group include a benzene ring, a naphthalene ring, and a fluorene ring.

$L^{b3}$ represents an alkylene group or a divalent aromatic group. The number of carbon atoms in the alkylene group represented by $L^{b3}$ is not particularly limited, and is preferably 1 to 5 and more preferably 1 to 3. The alkylene group represented by $L^{b3}$ may be linear or branched. Examples of the divalent aromatic group represented by $L^{b3}$ include the groups described as the divalent aromatic group represented by $L^{b2}$ and $L^{b4}$.

In a case where the polyfunctional compound is a polymer, the polyfunctional compound preferably contains a repeating unit represented by Formula (C).

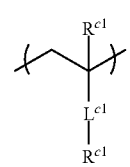

Formulal (C)

In Formula (C), $R^{c1}$ represents a hydrogen atom or an alkyl group. The number of carbon atoms in the alkyl group is not particularly limited, and is preferably 1 to 3 and more preferably 1.

$L^{c1}$ represents a single bond or a divalent linking group. The divalent linking group is not particularly limited, and examples thereof include —COO—, —CO—, —O—, an alkylene group (preferably having 1 to 10 carbon atoms and more preferably 1 to 5 carbon atoms), a cycloalkylene group (preferably having 3 to 20 carbon atoms), an arylene group (preferably having 6 to 20 carbon atoms), —SO—, —SO$_2$—, —NH—, —NR—, and a divalent linking group formed by a combination of two or more thereof. The R represents an alkyl group (preferably having 1 to 10 carbon atoms), a cycloalkyl group (preferably having 3 to 20 carbon atoms), or an aryl group (preferably having 6 to 20 carbon atoms).

Examples of the divalent linking group formed by a combination of two or more thereof include a —COO-alkylene group- and a —CONH—alkylene group.

The alkylene group may be linear or branched. In addition, the alkylene group may contain a cyclic structure such as an aliphatic ring (preferably an aliphatic cyclic hydrocarbon having 5 or more carbon atoms, more specifically a cyclohexane ring).

$R^{c2}$ represents a polymerizable group. Examples of the polymerizable group include groups exemplified by the polymerizable group that the liquid crystal compound may have, as described above.

In a case where the polyfunctional compound contains the repeating unit represented by Formula (C), the content of the repeating unit represented by Formula (C) is preferably 20% to 100% by mass and more preferably 40% to 100% by mass with respect to all the repeating units of the polyfunctional compound.

In a case where the polyfunctional compound is a polymer, the polyfunctional compound preferably contains a repeating unit represented by Formula (D).

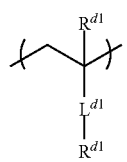

Formula (D)

In Formula (D), $R^{d1}$ represents a hydrogen atom or an alkyl group. The number of carbon atoms in the alkyl group is not particularly limited, and is preferably 1 to 3 and more preferably 1.

$L^{d1}$ represents a single bond or a divalent linking group. Examples of the divalent linking group represented by $L^{d1}$ include the groups exemplified as the divalent linking group represented by $L^{c1}$ described above.

$R^{d2}$ represents an alkyl group or a monovalent aromatic group.

The number of carbon atoms in the alkyl group is not particularly limited, and is preferably 6 or more, more preferably 8 or more, and still more preferably 12 or more. The upper limit thereof is not particularly limited, and is preferably 20 or less and more preferably 15 or less.

The aromatic ring constituting the monovalent aromatic group may be a monocyclic ring or a polycyclic ring. Examples of the monovalent aromatic group include a monovalent aromatic hydrocarbon ring group and a monovalent aromatic heterocyclic group. Examples of the aromatic hydrocarbon ring constituting the monovalent aromatic hydrocarbon ring group include a benzene ring, a naphthalene ring, and a fluorene ring.

In a case where the polyfunctional compound contains the repeating unit represented by Formula (D), the content of the repeating unit represented by Formula (D) is preferably 20% to 80% by mass and more preferably 40% to 60% by mass with respect to all the repeating units of the polyfunctional compound.

In addition, in a case where the polyfunctional compound contains the repeating units represented by Formula (C) and Formula (D), the content of the repeating unit represented by Formula (C) is preferably 20% to 80% by mass and more preferably 40% to 60% by mass.

The cured substance of the polyfunctional compound is a product obtained by reacting (polymerizing) the polymerizable group of the above-mentioned polyfunctional compound.

As will be described later, by using a polymerizable liquid crystal composition containing the polyfunctional compound, the reaction (polymerization) of the polyfunctional compound also proceeds during a curing treatment in a case of forming a liquid crystal layer, which leads to inclusion of the cured substance of the polyfunctional compound in the liquid crystal layer.

The content of the cured substance of the polyfunctional compound in the liquid crystal layer is not particularly limited, and is preferably 0.05% to 10.0% by mass and more preferably 0.10% to 5.0% by mass with respect to the total mass of the liquid crystal layer, from the viewpoint that the effect of the present invention is more excellent.

Other Members

The optical film may include a member other than the stretched resin film and the liquid crystal layer described above.

The stretched resin film may have a mixed layer containing a cured substance of a polyfunctional compound and a resin constituting the stretched resin film between the stretched resin film and the liquid crystal layer.

As will be described later, in a case where the polymerizable liquid crystal composition is applied onto the stretched resin film to form a liquid crystal layer, the surface of the stretched resin film may be partially dissolved depending on the components (in particular, a solvent) contained in the polymerizable liquid crystal composition to form a layer containing the resin contained in the stretched resin film and the cured substance of the polyfunctional compound, and this layer corresponds to the mixed layer.

In a case where the mixed layer is present, the optical film has the stretched resin film, the mixed layer, and the liquid crystal layer in this order. The stretched resin film and the mixed layer are preferably in direct contact with each other, and the mixed layer and the liquid crystal layer are preferably in direct contact with each other.

The mixed layer corresponds to a layer containing two components, the resin constituting the stretched resin film and the cured substance of the polyfunctional compound.

The presence of the mixed layer can be identified by time-of-flight secondary ion mass spectrometry (TOF-SIMS). More specifically, in a case where the components in the depth direction of the liquid crystal layer are analyzed by the time-of-flight secondary ion mass spectrometry while irradiating the liquid crystal layer with an ion beam, from the surface of the liquid crystal layer opposite to the stretched resin film side toward the surface of the liquid crystal layer on the stretched resin film side, and a profile in the depth direction of the secondary ion intensity of each component is obtained, the thickness region in which the secondary ion intensity derived from the resin constituting the stretched resin film and three secondary ion intensities derived from the cured substance of the polyfunctional compound are observed corresponds to the mixed layer.

The thickness of the mixed layer is not particularly limited, and is preferably 5 to 50 nm from the viewpoint that the effect of the present invention is more excellent.

In the present specification, the thickness of the mixed layer is intended to refer to an average thickness of the mixed layer. The average thickness is obtained by measuring the thicknesses of any five or more points of the mixed layer by the TOF-SIMS and arithmetically averaging the measured values.

Method for Producing Optical Film

The method for producing the optical film according to the embodiment of the present invention is not particularly limited, and a known method can be adopted.

Above all, a method in which a polymerizable liquid crystal composition containing a liquid crystal compound having a polymerizable group (hereinafter, also referred to as a polymerizable liquid crystal compound) is applied onto a stretched resin film, the polymerizable liquid crystal compound in the obtained coating film is aligned, and the coating film is subjected to a curing treatment is preferable.

Hereinafter, the method using the liquid crystal composition will be described in detail.

The polymerizable liquid crystal composition contains the polymerizable liquid crystal compound. Examples of the liquid crystal compound include a rod-like liquid crystal compound and a disk-like liquid crystal compound as described above.

The content of the polymerizable liquid crystal compound in the polymerizable liquid crystal composition is preferably 50% to 98% by mass and more preferably 70% to 95% by mass with respect to the total solid content of the composition.

The solid content means a component from which a solvent has been removed and which can form a liquid crystal layer. Even in a case where a component itself is in a liquid state, such a component is regarded as the solid content.

The polymerizable liquid crystal composition may contain a component other than the polymerizable liquid crystal compound. The other component may be, for example, a polymerization initiator. The polymerization initiator used is selected according to the type of polymerization reaction, and examples thereof include a thermal polymerization initiator and a photopolymerization initiator.

The content of the polymerization initiator in the polymerizable liquid crystal composition is preferably 0.01% to 20% by mass and more preferably 0.5% to 10% by mass with respect to the total solid content of the composition.

The polymerizable liquid crystal composition may contain the above-mentioned polyfunctional compound.

The content of the polyfunctional compound in the polymerizable liquid crystal composition is preferably 0.1% to 10.0% by mass and more preferably 0.2% to 5.0% by mass with respect to the total mass of the polymerizable liquid crystal compound.

Examples of other components that may be contained in the polymerizable liquid crystal composition include an alignment control agent (a vertical alignment agent or a horizontal alignment agent), a surfactant, an adhesion improver, a plasticizer, and a solvent, in addition to the foregoing components.

The polymerizable liquid crystal composition preferably contains a chiral agent in order to twist-align a liquid crystal compound. The chiral agent is added to twist-align a liquid crystal compound, but of course, it is not necessary to add the chiral agent in a case where the liquid crystal compound is a compound exhibiting an optical activity such as having an asymmetric carbon in a molecule thereof. In addition, it is not necessary to add the chiral agent, depending on the production method and the twisted angle.

The chiral agent is not particularly limited in a structure thereof as long as it is compatible with the liquid crystal compound used in combination. Any of the known chiral agents (for example, "Liquid Crystal Device Handbook" edited by the 142nd Committee of the Japan Society for the Promotion of Science, Chapter 3, 4-3, Chiral agent for TN and STN, p. 199, 1989) can be used.

The amount of the chiral agent used is not particularly limited and is adjusted such that the above-mentioned twisted angle is achieved.

Examples of the method of applying the polymerizable liquid crystal composition include a curtain coating method, a dip coating method, a spin coating method, a printing coating method, a spray coating method, a slot coating method, a roll coating method, a slide coating method, a blade coating method, a gravure coating method, and a wire bar method.

Next, the formed coating film is subjected to an alignment treatment to align a polymerizable liquid crystal compound in the coating film.

The alignment treatment can be carried out by drying the coating film at room temperature or by heating the coaling film. In a case of a thermotropic liquid crystal compound, the liquid crystal phase formed by the alignment treatment can generally be transferred by a change in temperature or pressure. In a case of a lyotropic liquid crystal compound, the liquid crystal phase formed by the alignment treatment can also be transferred by a compositional ratio such as an amount of solvent.

The conditions for heating the coating film are not particularly limited, and the heating temperature is preferably 50° C. to 250° C. and more preferably 50° C. to 150° C., and the heating time is preferably 10 seconds to 10 minutes.

In addition, after the coating film is heated, the coating film may be cooled, if necessary, before a curing treatment (light irradiation treatment) which will be described later.

Next, the coating film in which the polymerizable liquid crystal compound is aligned is subjected to a curing treatment.

The method of the curing treatment carried out on the coating film in which the polymerizable liquid crystal compound is aligned is not particularly limited, and examples thereof include a light irradiation treatment and a heat treatment. Above all, from the viewpoint of manufacturing suitability, a light irradiation treatment is preferable, and an ultraviolet irradiation treatment is more preferable.

The irradiation conditions of the light irradiation treatment are not particularly limited, and an irradiation amount of 50 to 1,000 mJ/cm$^2$ is preferable.

The atmosphere during the light irradiation treatment is not particularly limited and is preferably a nitrogen atmosphere.

Although the aspect in which the polymerizable liquid crystal composition is used has been described above, the present invention is not limited to such an aspect.

For example, a liquid crystal composition containing a liquid crystal compound having no polymerizable group may be used.

In addition, the stretched resin film and the liquid crystal layer may be separately prepared and bonded to each other through an adhesion layer (for example, an adhesive layer or a pressure-sensitive adhesive layer) to produce the optical film according to the embodiment of the present invention.

Applications

The above-mentioned optical film can be applied to various applications and can be used, for example, as a so-called λ/4 plate or λ/2 plate by adjusting the in-plane retardation of the optical film.

The λ/4 plate is a plate having a function of converting linearly polarized light having a specific wavelength into circularly polarized light (or circularly polarized light into linearly polarized light). More specifically, the λ/4 plate is a plate in which the in-plane retardation Re at a predetermined wavelength of λ nm is λ/4 (or an odd multiple thereof).

The in-plane retardation (Re(550)) at a wavelength of 550 nm of the λ/4 plate may have an error of about 25 nm centered on an ideal value (137.5 nm), and is, for example, preferably 110 to 160 nm and more preferably 120 to 150 nm.

In addition, the λ/2 plate refers to an optically anisotropic film in which the in-plane retardation Re(λ) at a specific wavelength of λ nm satisfies Re(λ)≈λ/2. This expression may be achieved at any wavelength (for example, 550 nm) in the visible light region. Above all, it is preferable that the in-plane retardation Re(550) at a wavelength of 550 nm satisfies the following relationship.

210 nm≤Re(550)≤5.300 nm

Polarizing Plate

The optical film according to the embodiment of the present invention can be suitably applied to a polarizing plate.

That is, the polarizing plate according to the embodiment of the present invention (preferably a circularly polarizing plate) includes an optical film and a polarizer. The circularly polarizing plate is an optical element that converts unpolarized light into circularly polarized light.

The polarizer may be any member having a function of converting light into specific linearly polarized light (linear polarizer), and an absorption type polarizer can be mainly used.

Examples of the absorption type polarizer include an iodine-based polarizer, a dye-based polarizer using a dichroic dye, and a polyene-based polarizer. The iodine-based polarizer and the dye-based polarizer include a coating type polarizer and a stretching type polarizer, both of which can be applied. A polarizer prepared by adsorbing iodine or a dichroic dye on a polyvinyl alcohol, followed by stretching is preferable.

Image Display Apparatus

The optical film according to the embodiment of the present invention can be suitably applied to an image display apparatus.

The image display apparatus according to the embodiment of the present invention has a display element and the above-mentioned optical film.

In a case where the optical film according to the embodiment of the present invention is applied to an image display apparatus, the optical film may be applied as the above-mentioned polarizing plate. That is, the image display apparatus according to the embodiment of the present invention may include a display element, the above-mentioned optical film, and a polarizer. In this case, the optical film and the polarizer according to the embodiment of the present invention preferably constitute a circularly polarizing plate, the circularly polarizing plate is arranged on the viewing side, and the polarizer is arranged on the viewing side in the circularly polarizing plate.

The image display element is not particularly limited, and examples thereof include an organic electroluminescence display element and a liquid crystal display element.

EXAMPLES

Hereinafter, features of the present invention will be described more specifically with reference to Examples and Comparative Examples. The materials, amounts used, proportions, treatment details, treatment procedure, and the like shown in the following Examples can be appropriately changed without departing from the spirit and scope of the present invention. Therefore, the scope of the present invention should not be construed as being limited by the specific examples given below.

Production of Stretched Resin Film 1

A pellet of norbornene-based resin (ZEONOR 1420, manufactured by Zeon Corporation) was molded by a T die film extruder to obtain an unstretched cycloolefin polymer substrate having a thickness of 100 μm.

The obtained unstretched resin film was stretched in a machine direction and then stretched in an oblique direction to obtain an obliquely stretched resin film. The stretching temperature and the stretching ratio of the film were adjusted such that the in-plane retardation at a wavelength of 550 nm was 180 nm and the slow axis direction was −13°.

In the slow axis direction, the clockwise direction is represented by a negative value with respect to the transport direction of the film upon observation from the surface (the side where a liquid crystal layer is formed) of the obtained stretched resin film.

Production of stretched resin film 2 Syndiotactic polystyrene ("130-ZC", manufactured by Idemitsu Kosan Co., Ltd., glass transition temperature: 98° C., crystallization temperature: 140° C.) was supplied to a twin-screw extruder and melt-extruded into a sheet at about 280° C. to obtain an unstretched resin film having a thickness of 100 μm.

The obtained unstretched resin film was stretched in a machine direction and then stretched in an oblique direction to obtain an obliquely stretched resin film. The stretching temperature and the stretching ratio of the film were adjusted such that the in-plane retardation at a wavelength of 550 nm was 180 nm and the slow axis direction was −13°.

Example 1

A polymerizable liquid crystal composition (1) containing a rod-like liquid crystal compound having the following composition was applied onto the stretched resin film 1 using a geeser coating machine to form a coating film. Next, the obtained coating film was heated at 90° C. for 100 seconds. A twisted layer in which the rod-like liquid crystal compound in the coating film was twist-aligned was obtained by this heating. After that, nitrogen purging was carried out to bring an oxygen concentration to 100 ppm by volume, and the coating film was irradiated (irradiation amount: 500 mJ/cm$^2$) with ultraviolet rays using a metal halide lamp (manufactured by Eye Graphics Co., Ltd.) to prepare an optical film 1 in which the alignment state of the liquid crystal compound was fixed.

| Polymerizable liquid crystal composition (1) | |
|---|---|
| Rod-like liquid crystal compound (A) given below | 80 parts by mass |
| Rod-like liquid crystal compound (B) given below | 10 parts by mass |
| Polymerizable compound (C) given below | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (Irgacure 819, manufactured by BASF SE) | 3 parts by mass |
| Left-handed twisting chiral agent (L1) given below | 0.43 parts by mass |
| Polymer (A) given below | 0.08 parts by mass |
| Poly functional compound: A-DCP | 1.00 parts by mass |
| Solvent: methyl isobutyl ketone | 156 parts by mass |

Rod-like liquid crystal compound (A)
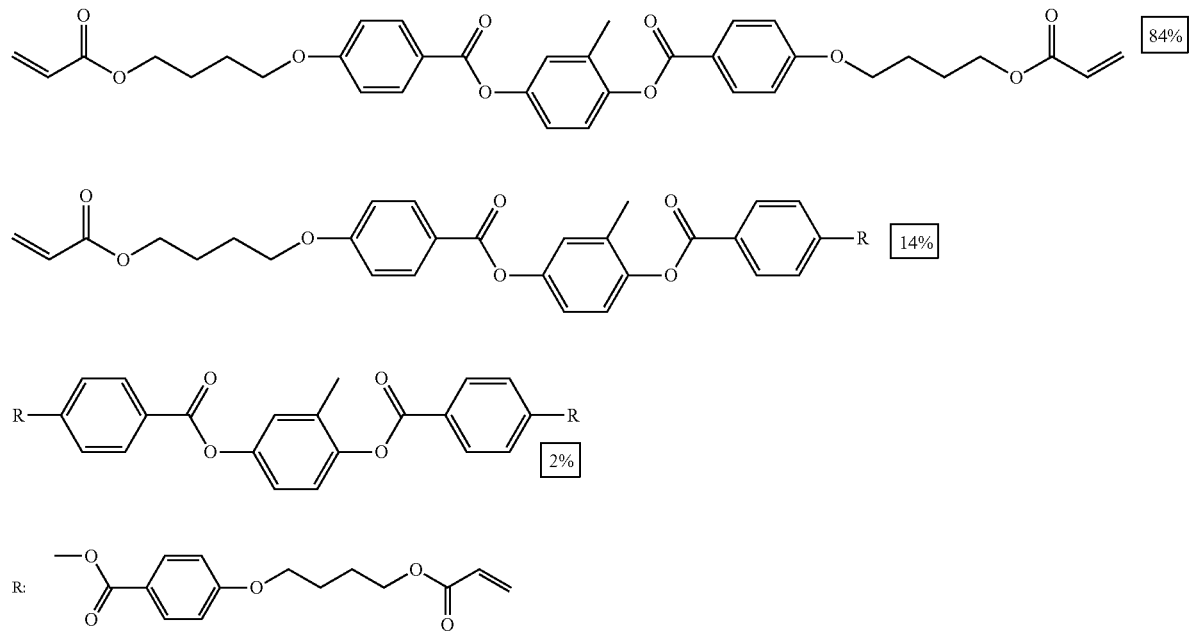
Rod-like liquid crystal compound (B)
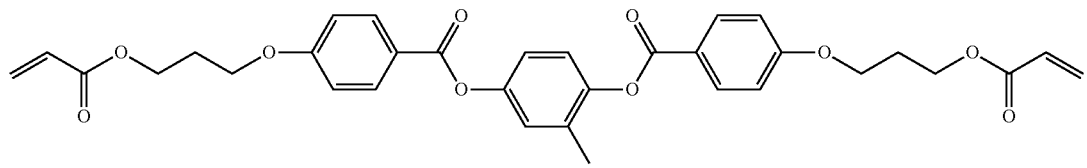 [SMILES: C=CC(=O)OCCCOc1ccc(C(=O)Oc2ccc(OC(=O)c3ccc(OCCCOC(=O)C=C)cc3)c(C)c2)cc1]
Polymerizable compound (C)
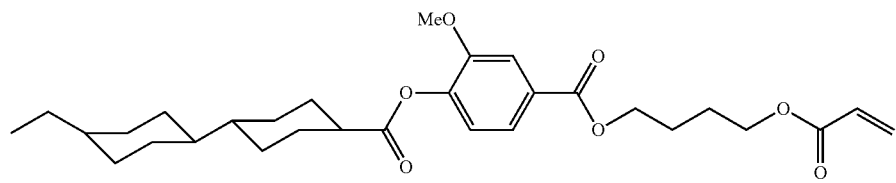 [SMILES: C=CC(=O)OCCCCOC(=O)c1ccc(OC(=O)C2CCC(C3CCC(CC)CC3)CC2)c(OC)c1]
Left-handed twisting chiral agent (L1)
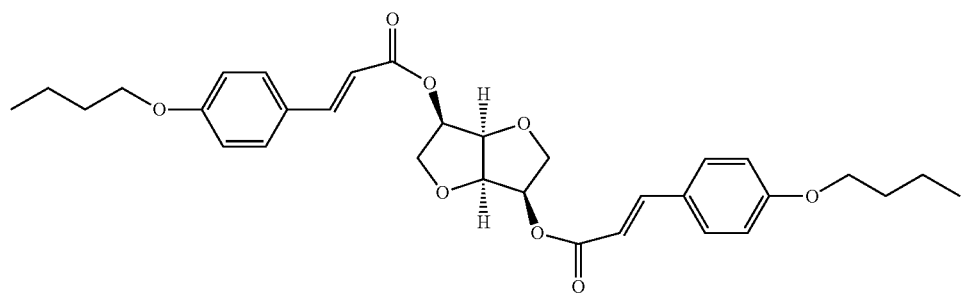 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

Polymer (A) (In the formulae, the numerical value described in each repeating unit represents the content (% by mass) of each repeating unit with respect to all the repeating units).

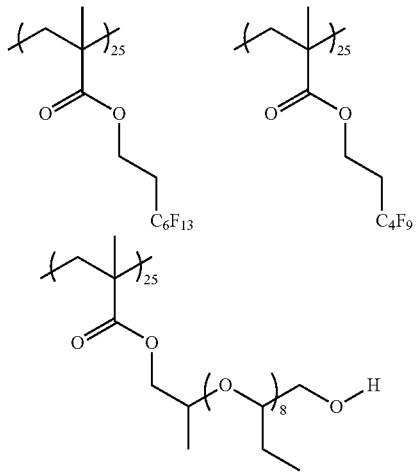

A-DCP (tricyclodecane dimethanol diacrylate)

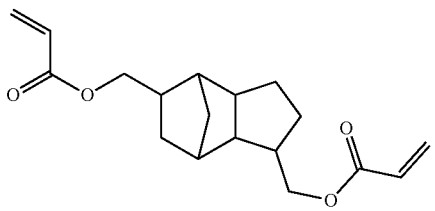 [SMILES: C=CC(=O)OCC1CC2CC1C1CCC(COC(=O)C=C)C21]

Examples 2 to 12 and Comparative Examples 2, 3, and 5

Optical films 2 to 12, C2, C3, and C5 were prepared according to the same procedure as in Example 1, except that the types of the stretched resin film, the solvent, and the polyfunctional compound were changed as shown in the table which will be given later.

Comparative Example 1

An optical film C1 was prepared according to the same procedure as in Example 1, except that a polymerizable liquid crystal composition (2) was used instead of the polymerizable liquid crystal composition (1).

| Polymerizable liquid crystal composition (2) | |
|---|---|
| Rod-like liquid crystal compound (A) given above | 80 parts by mass |
| Rod-like liquid crystal compound (B) given above | 10 parts by mass |
| Polymerizable compound (C) given above | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (Irgacure 819, manufactured by BASF SE) | 3 parts by mass |
| Polymer (A) given above | 0.08 parts by mass |

| Polymerizable liquid crystal composition (2) | |
|---|---|
| Polyfunctional compound: A-DCP | 1.00 parts by mass |
| Solvent: acetone | 156 parts by mass |

Comparative Example 4

An optical film C4 was prepared according to the same procedure as in Comparative Example 1, except that the types of the stretched resin film, the solvent, and the polyfunctional compound were changed as shown in the table which will be given later.

The optical properties of the liquid crystal layer included in the optical film of each of Examples and Comparative Examples were determined using AxoScan of Axometrics, Inc. and analysis software (Multi-Layer Analysis) of Axometrics, Inc.

In the optical films of Examples 1 to 12 and Comparative Examples 2 to 4, the product ($\Delta$nd) of $\Delta$n at a wavelength of 550 nm and the thickness d of the liquid crystal layer was 180 nm, the twisted angle of the liquid crystal compound was 80°, the alignment axis angle of the liquid crystal compound with respect to the long longitudinal direction (transport direction) was −13° on the surface of the liquid crystal layer on the stretched resin film side and −93° on the surface of the liquid crystal layer on the air interface side, and the liquid crystal layer formed a twisted alignment.

In the optical films of Comparative Example 1, the product ($\Delta$nd) of $\Delta$n at a wavelength of 550 nm and the thickness d of the liquid crystal layer was 180 mu, the twisted angle of the liquid crystal compound was 0°, the alignment axis angle of the liquid crystal compound with respect to the long longitudinal direction (transport direction) was −13° on the surface of the liquid crystal layer on the stretched resin film side and −13° on the surface of the liquid crystal layer on the air interface side, and the liquid crystal layer formed a homogeneous alignment.

In the alignment axis angle, the clockwise direction is represented by a negative value with respect to the long longitudinal direction (transport direction) upon observation from the liquid crystal layer side of the obtained optical film.

Preparation of Circularly Polarizing Plate

Preparation of Polarizes

A polyvinyl alcohol (PVA) film having a thickness of 80 μm was dyed by immersing it in an iodine aqueous solution having an iodine concentration of 0.05% by mass at 30° C. for 60 seconds. Next, the obtained film was machine-direction stretched 5 times its original length while immersed in a boric acid aqueous solution having a boric acid concentration of 4% by mass for 60 seconds, and then dried at 50° C. for 4 minutes to obtain a polarizer having a thickness of 20 μm.

Preparation of Polarizer Protective Film

A commercially available cellulose acylate-based film FUJITAC TG40UL (manufactured by FUJIFILM Corporation) was prepared and immersed at 1.5 mol/liter in a sodium hydroxide aqueous solution at 55° C., and then the sodium hydroxide was thoroughly washed away with water. Thereafter, the obtained film was immersed at 0.005 mol/liter in a dilute sulfuric acid aqueous solution at 35° C. for 1 minute, and then immersed in water to thoroughly wash away the dilute sulfuric acid aqueous solution. Finally, the obtained film was sufficiently dried at 120° C. to prepare a polarizer protective film whose surface was subjected to a saponification treatment.

Preparation of Circularly Polarizing Plate

The above-mentioned polarizer and the above-mentioned polarizer protective film were continuously bonded to each other using a polyvinyl alcohol-based adhesive to obtain a polarizer with a polarizer protective film.

The stretched resin film side of each of the optical films 1 to 12 and C1 to C5 prepared above was bonded to the polarizer side of the above-mentioned polarizer with a polarizer protective film with a pressure-sensitive adhesive SK2057 (manufactured by Soken Chemical & Engineering Co., Ltd.) to prepare a long circularly polarizing plate.

Then, the pressure-sensitive adhesive side of the pressure-sensitive adhesive SK2057 (manufactured by Soken Chemical & Engineering Co., Ltd.) having a single-sided separator was bonded to the liquid crystal layer side of the optical film to obtain laminates 1 to 12 and C1 to C5 including a circularly polarizing plate. The laminate had a polarizer protective film, a polarizer, a pressure-sensitive adhesive, a stretched resin film, a liquid crystal layer, a pressure-sensitive adhesive, and a separator in this order.

Evaluation

Evaluation of TOF-SIMS

While etching from the surface of the liquid crystal layer opposite to the stretched resin film side, TOF-SIMS was measured to obtain a depth direction profile of the secondary ion intensity derived from the cured substance of the polyfunctional compound and the secondary ion intensity derived from the resin contained in the stretched resin film until the stretched resin film was reached.

From the obtained depth direction profile, the thickness region where both the secondary ion intensity derived from the cured substance of the polyfunctional compound and the secondary ion intensity derived from the resin contained in the stretched resin film were confirmed until the stretched resin film was reached was defined as the mixed layer, and the thickness of the mixed layer was evaluated according to the following standards.

1: The thickness of the mixed layer is less than 5 nm
2: The thickness of the mixed layer is 5 to 50 nm
3: The thickness of the mixed layer is more than 50 mu and 100 nm or less.
4: The thickness of the mixed layer is more than 100 nm From the depth direction profile obtained above, the case where the cured substance of the polyfunctional compound was more present on the surface of the liquid crystal layer on the stretched resin film side than on the surface of the liquid crystal layer opposite to the stretched resin film side was designated as "A", and the case where the cured substance of the polyfunctional compound was not more present on the surface of the liquid crystal layer on the stretched resin film side was designated as "B".

Evaluation of Punching Performance

The laminate including the prepared circularly polarizing plate was placed in a constant temperature bath (manufactured by ESPEC Corp.) at 80° C. for 24 hours, humidity control was then carried out for 3 hours in a room with a temperature of 25° C. and a relative humidity of 60%, and then 4 sheets were punched from the polarizer protective film side by a punching machine with a 4 cm×4 cm Thomson blade (manufactured by Nakayama Co., Ltd.). The condition of cracks on each side of the punched 4 cm×4 cm polarizing plate sample was observed with a magnifying glass and evaluated based on the following standards. The evaluation of C grade or higher may have a practical use.

A: No crack occurred
B: A crack of less than 0.1 mm occurred from the punched edge surface.
C: A crack of 0.1 mm or more and less than 0.2 mm occurred from the punched edge surface.
D: A crack of 0.2 mm or more occurred from the punched edge surface.

In the evaluation of grades B to D, cracks occurred in the optical film.

Table 1 shows the δa values of the resin contained in the stretched resin film and the polyfunctional compound calculated by the above-mentioned method.

The three-dimensional solubility parameters (δd, δp, δh) of COP were (18.0, 3.0, 2.0). The three-dimensional solubility parameters (δd, δp, δh) of PSt were (18.5, 4.5, 2.9). For the HSP of the polyfunctional compound, the value calculated by inputting the SMILES of each polyfunctional compound in the DIY function of HSPiP (ver. 5.1.08) was used.

In Table 1, the column "Type" in the column "Stretched resin film" represents the stretched resin film used, "COP" means that the stretched resin film 1 was used, and "PSt" means that the stretched resin film 2 was used.

In Table 1, the column "Alignment state" in the column "Liquid crystal layer" represents the alignment state of the liquid crystal compound, "Twist" means that a twist-aligned liquid crystal compound is fixed, and "Homogeneous" means that a homogeneously aligned liquid crystal compound is fixed.

In Table 1, the column "Solvent" in the column "Liquid crystal layer" represents the type of solvent contained in the polymerizable liquid crystal composition. The notation "A/B=50/50" means that the solvent A and the solvent B are mixed at a mass ratio of 50:50.

In Table 1, the column "Molecular weight" in the column "Polyfunctional compound" represents the weight-average molecular weight of the corresponding polyfunctional compound.

In Table 1, the column "Sa" in the column "Polyfunctional compound" represents δa of the polyfunctional compound.

In Table 1, the column "Difference of δa" represents the absolute value of the difference between δa of the resin contained in the stretched resin film and δa of the polyfunctional compound.

All of the polyfunctional compounds shown in Table 1 were non-liquid crystalline.

In Table 1, the polymer (B) is a polymer represented by the following formula. "40" and "60" described in each repeating unit represent the content (% by mass) of each repeating unit with respect to all the repeating units in the polymer.

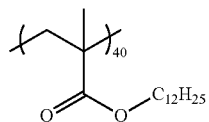

-continued

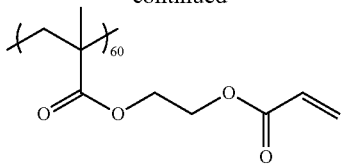

In Table 1, the polymer (C) is a polymer represented by the following formula. "100" described in the repeating unit represent the content (% by mass) of the repeating unit with respect to all the repeating units in the polymer.

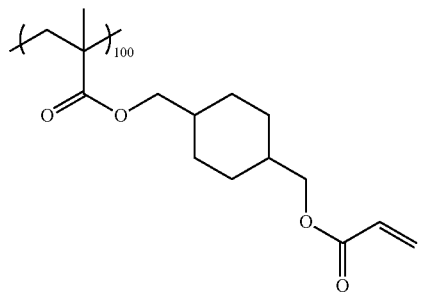

In Table 1, the polymer (D) is a polymer represented by the following formula. "50" and "50" described in each repeating unit represent the content (% by mass) of each repeating unit with respect to all the repeating units in the polymer.

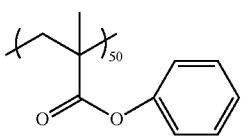

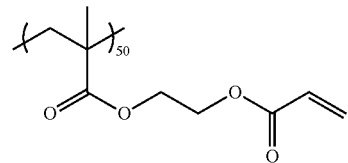

In Table 1, the polymer (E) is a polymer represented by the following formula. "100" described in the repeating unit represent the content (% by mass) of the repeating unit with respect to all the repeating units in the polymer.

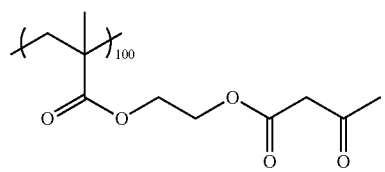

| | Stretched resin film | | Liquid crystal layer | | Polyfunctional compound | | | Diff- erence of δa | Uneven distri- bution | Mixed layer thick- ness | Punching |
|---|---|---|---|---|---|---|---|---|---|---|---|
| | Optical film | Type | δa of resin | Alignment state | Solvent | Type | Molecular Weight | δa | | | | |
| Example 1 | 1 | COP | 3.6 | Twist | Acetone | Tricyclodecane dimethanol diacrylate | — | 4.7 | 1.1 | A | 2 | B |
| Example 2 | 2 | COP | 3.6 | Twist | Acetone/ PGME = 50/50 | Tricyclodecane dimethanol diacrylate | — | 4.7 | 1.1 | A | 2 | C |
| Example 3 | 3 | COP | 3.6 | Twist | Acetone/ ethyl acetate = 50/50 | Tricyclodecane dimethanol diacrylate | — | 4.7 | 1.1 | A | 2 | C |
| Example 4 | 4 | COP | 3.6 | Twist | Acetone | 1,6-hexanediol diacrylate | — | 6.4 | 2.8 | A | 2 | C |
| Example 5 | 5 | COP | 3.6 | Twist | Acetone | 1,9-nonanediol diacrylate | — | 5.3 | 1.7 | A | 2 | B |
| Example 6 | 6 | COP | 3.6 | Twist | Acetone | Polymer (B) | 18000 | 7.5 | 3.9 | A | 2 | A |
| Example 7 | 7 | COP | 3.6 | Twist | Acetone | Polymer (C) | 25000 | 7.2 | 3.6 | A | 2 | A |
| Example 8 | 8 | COP | 3.6 | Twist | Acetone | Ethoxylated bisphenol A diacrylate | — | 6.2 | 2.6 | B | 2 | C |
| Example 9 | 9 | PSt | 5.4 | Twist | Acetone | Ethoxylated bisphenol A diacrylate | — | 6.2 | 0.8 | A | 2 | B |
| Example 10 | 10 | PSt | 5.4 | Twist | Acetone | 9,9-bis[4-(2-hydroxyethoxy) phenyl]fluorone diacrylate | — | 4.6 | 0.7 | A | 2 | B |
| Example 11 | 11 | PSt | 5.4 | Twist | Acetone | Polymer (D) | 22000 | 8.4 | 3.1 | A | 2 | A |
| Example 12 | 12 | PSt | 5.4 | Twist | Acetone | Diethylene glycol diacrylate | — | 8.4 | 3.1 | B | 2 | C |
| Comparative Example 1 | C1 | COP | 3.6 | Homogeneous | Acetone | Tricyclodecane dimethanol diacrylate | — | 4.7 | 1.1 | A | 2 | D |

-continued

| | Optical film | Stretched resin film Type | δa of resin | Liquid crystal layer Alignment state | Solvent | Polyfunctional compound Type | Molecular Weight | δa | Difference of δa | Uneven distribution | Mixed layer thickness | Punching |
|---|---|---|---|---|---|---|---|---|---|---|---|---|
| Comparative Example 2 | C2 | COP | 3.6 | Twist | Acetone | Diethylene glycol diacrylate | — | 8.4 | 4.8 | B | 2 | D |
| Comparative Example 3 | C3 | COP | 3.6 | Twist | Acetone | Polymer (E) | 22000 | 10.1 | 6.5 | B | 2 | D |
| Comparative Example 4 | C4 | PSt | 5.4 | Homogeneous | | Ethoxylated bisphenol A diacrylate | — | 6.2 | 0.8 | A | 2 | D |
| Comparative Example 5 | C5 | PSt | 5.4 | Twist | Acetone | Polymer (E) | 20000 | 10.1 | 4.8 | B | 2 | D |

As shown in Table 1, the optical film according to the embodiment of the present invention exhibited a desired effect.

From the comparison of Examples 1 to 3, it was confirmed that the effect is more excellent in a case where the thickness of the mixed layer is 5 to 50 nm.

From the comparison of Examples 4 and 5, it was confirmed that the effect is more excellent in a case where the polyfunctional compound has a linear hydrocarbon group having 8 or more carbon atoms.

From the comparison of Examples 6, 7, and 11, it was confirmed that the effect is more excellent in a case where the polyfunctional compound is a polymer having a weight-average molecular weight of 10,000 or more.

From the comparison of Examples 8 and 9, it was confirmed that the effect is more excellent in a case where the cured substance of the polyfunctional compound is more present on the surface of the liquid crystal layer on the stretched resin film side than on the surface of the liquid crystal layer opposite to the stretched resin film side.

From the comparison of Examples 9 and 12, it was confirmed that the effect is more excellent in a case where the stretched resin film contains polystyrene, and the polyfunctional compound is non-liquid crystalline and has one or more aromatic rings.

What is claimed is:

1. An optical film comprising:
   a stretched resin film; and
   a liquid crystal layer formed by fixing a liquid crystal compound twist-aligned along a helical axis extending along a direction in thickness,
   wherein a δa value calculated using a three-dimensional solubility parameter of a resin in the stretched resin film is 8.0 MPa$^{1/2}$ or less,
   the liquid crystal layer contains a cured substance of a polyfunctional compound having two or more polymerizable groups in one molecule, and
   an absolute value of a difference between a δa value calculated using the three-dimensional solubility parameter of the polyfunctional compound and the δa value calculated using the three-dimensional solubility parameter of the resin is 4.0 MPa$^{1/2}$ or less.

2. The optical film according to claim 1,
   wherein the cured substance of the polyfunctional compound is more present on a surface of the liquid crystal layer on a stretched resin film side than on a surface of the liquid crystal layer opposite to the stretched resin film side.

3. The optical film according to claim 1, further comprising: between the stretched resin film and the liquid crystal layer,
   a mixed layer containing the cured substance of the polyfunctional compound and the resin constituting the stretched resin film.

4. The optical film according to claim 3,
   wherein a thickness of the mixed layer is 5 to 50 nm.

5. The optical film according to claim 1,
   wherein the stretched resin film contains a resin selected from the group consisting of a cycloolefin polymer and polystyrene.

6. The optical film according to claim 1,
   wherein the stretched resin film contains a cycloolefin polymer, and
   the polyfunctional compound is non-liquid crystalline and has a hydrocarbon group having 5 or more carbon atoms.

7. The optical film according to claim 6,
   wherein the polyfunctional compound has at least one group selected from the group consisting of a linear hydrocarbon group having 8 or more carbon atoms and a cyclic hydrocarbon group having 5 or more carbon atoms.

8. The optical film according to claim 1,
   wherein the stretched resin film contains polystyrene, and the polyfunctional compound is non-liquid crystalline and has one or more aromatic rings.

9. The optical film according to claim 1,
   wherein a weight-average molecular weight of the polyfunctional compound is 10,000 or more.

10. The optical film according to claim 1,
    wherein an in-plane retardation at a wavelength of 550 nm of the stretched resin film is 100 to 250 nm.

11. The optical film according to claim 1,
    wherein a twisted angle of the liquid crystal compound is 60° to 100°, and
    a product Δnd of a refractive index anisotropy Δn at a wavelength of 550 nm of the liquid crystal layer and a thickness d of the liquid crystal layer is 100 to 250 nm.

12. A circularly polarizing plate comprising:
    the optical film according to claim 1.

13. An image display apparatus comprising:
    the optical film according to claim 1.

14. The optical film according to claim 2, further comprising: between the stretched resin film and the liquid crystal layer,
    a mixed layer containing the cured substance of the polyfunctional compound and the resin constituting the stretched resin film.

15. The optical film according to claim 2,
wherein the stretched resin film contains a resin selected from the group consisting of a cycloolefin polymer and polystyrene.

16. The optical film according to claim 3,
wherein the stretched resin film contains a resin selected from the group consisting of a cycloolefin polymer and polystyrene.

17. The optical film according to claim 4,
wherein the stretched resin film contains a resin selected from the group consisting of a cycloolefin polymer and polystyrene.

18. The optical film according to claim 2,
wherein the stretched resin film contains a cycloolefin polymer, and
the polyfunctional compound is non-liquid crystalline and has a hydrocarbon group having 5 or more carbon atoms.

19. The optical film according to claim 3,
wherein the stretched resin film contains a cycloolefin polymer, and
the polyfunctional compound is non-liquid crystalline and has a hydrocarbon group having 5 or more carbon atoms.

20. The optical film according to claim 4,
wherein the stretched resin film contains a cycloolefin polymer, and
the polyfunctional compound is non-liquid crystalline and has a hydrocarbon group having 5 or more carbon atoms.

* * * * *